United States Patent [19]

Blevins

[11] 4,301,666
[45] Nov. 24, 1981

[54] LUBRICATION SYSTEM FOR TRANSMISSION OF AUTOMATIC CLOTHES WASHING MACHINE

[75] Inventor: Theodore J. Blevins, Prospect, Ky.

[73] Assignee: General Electric Company, Louisville, Ky.

[21] Appl. No.: 154,634

[22] Filed: May 30, 1980

[51] Int. Cl.³ .............................................. D06F 39/00
[52] U.S. Cl. ................................... 68/23.7; 68/13 R; 192/113 B; 417/500
[58] Field of Search ...................... 68/13 R, 23.6, 23.7, 68/133; 74/467; 192/113 B; 417/500; 184/6.12

[56] References Cited

U.S. PATENT DOCUMENTS

| | | | |
|---|---|---|---|
| 3,129,669 | 4/1964 | Striegl | 417/199 R |
| 3,245,505 | 4/1966 | Staengle et al. | 192/113 B |
| 3,537,282 | 11/1970 | Gainer et al. | 74/467 X |
| 3,604,029 | 9/1971 | Bain | 68/13 R X |
| 3,637,049 | 1/1972 | Butterfield et al. | 184/6.12 |

Primary Examiner—Philip R. Coe
Attorney, Agent, or Firm—Radford M. Reams

[57] ABSTRACT

A lubrication system for the transmission of an automatic clothes washing machine is provided which includes a generally vertical hollow shaft arranged to be driven from the transmission. An oil pump includes a cup mounted on the lower end of the shaft for rotation therewith, and a piston slidably positioned on the shaft and receivable within this cup. The piston is arranged for sliding movement on the shaft, but is prevented from rotating with the shaft. The piston is biased toward the cup by a spring positioned on the shaft. The piston is formed to provide an inlet port on the outer wall thereof, and an outlet port on the inner wall, the outlet port being positioned in communication with a passage to the interior of a hollow shaft at predetermined intervals during rotation of the shaft. The cup and piston have engaging cam faces formed to cause the piston to move along the shaft against the bias of the spring during a portion of the cycle of rotation of the shaft to open the inlet port and further formed to provide abrupt return movement of the piston toward the cup under the influence of the biasing means to close the inlet port and force lubricant through the outlet port into the hollow interior of the shaft. The lubricant is pumped to the top of the hollow shaft and then distributed to the portions of the transmission requiring lubrication.

16 Claims, 10 Drawing Figures

LUBRICATION SYSTEM FOR TRANSMISSION OF AUTOMATIC CLOTHES WASHING MACHINE

BACKGROUND OF THE INVENTION

1. Field of the Invention

This invention relates to lubrication systems, and more particularly to such systems for use in lubricating the transmission of automatic clothes washing machines.

2. Description of the Prior Art

Automatic clothes washing machines normally include a transmission through which the agitator and the clothes basket are driven. The transmission provides for driving the agitator with an oscillating motion during the washing cycle and for driving the basket at a higher spinning speed during the spin cycle. Because of the number of engaging parts in such transmissions, and because of the desire for a relatively long period of trouble-free operation of the washing machine, it is necessary to provide dependable long term lubrication for the transmission.

It has been customary to provide such lubrication by immersing the entire transmission mechanism, including the several gears thereof, in a bath of oil or other liquid lubricant. This, of course, insures that all parts of the transmission are fully subjected to the action of the lubricant. However, such immersion of the moving parts of the transmission necessarily involves a substantial amount of oil. The rapidly escalating price of oil in recent times has substantially increased the cost of the oil required for such prior art-type lubrication systems. It has become increasingly important to provide a lubrication system which accomplishes the necessary lubrication of the transmission, but which requires significantly less oil.

The lubrication system of the present invention, by providing a novel pump and lubricant distribution system, has made it possible to obtain effective lubrication of all the moving parts of the transmission, while at the same time substantially reducing the amount of oil required. In the particular embodiment of the invention disclosed in this application, it has been found possible to reduce the amount of oil required to 35 to 40% of that previously needed.

Accordingly, it is the object of this invention to provide a lubrication system for the transmission of an automatic clothes washing machine which provides dependable lubrication over a long period of time.

It is a further object of this invention to provide such a lubrication system which significantly reduces the amount of oil prevously required.

It is a further object of this invention to provide such a lubrication system at a minimum of cost, consistent with dependable, long-life performance.

SUMMARY OF THE INVENTION

In carrying out the objects of this invention, in one form thereof, the lubrication system for the transmission of the automatic clothes washing machine includes a generally vertical hollow shaft arranged to be driven from the transmission. An oil pump includes a cup mounted on the lower end of the shaft for rotation therewith, and a piston slidably positioned on the shaft and receivable within this cup. The piston is arranged for sliding movement on the shaft, but is prevented from rotating with the shaft. The piston is biased toward the cup by a spring positioned on the shaft. The piston is formed to provide an inlet port on the outer wall thereof, and an outlet port on the inner wall, the outlet port being positioned in communication with a passage to the interior of a hollow shaft at predetermined intervals during rotation of the shaft. The cup and piston have engaging cam faces formed to cause the piston to move along the shaft against the bias of the spring during a portion of the cycle of rotation of the shaft to open the inlet port and further formed to provide abrupt return movement of the piston toward the cup under the influence of the biasing means to close the inlet port and force lubricant through the outlet port into the hollow interior of the shaft. The lubricant is pumped to the top of the hollow shaft and then distributed to the portions of the transmission requiring lubrication.

DESCRIPTION OF THE DRAWINGS

For a better understanding of this invention, references may be made to the accompanying drawings in which.

DESCRIPTION OF THE PREFERRED EMBODIMENT

Figure 1:
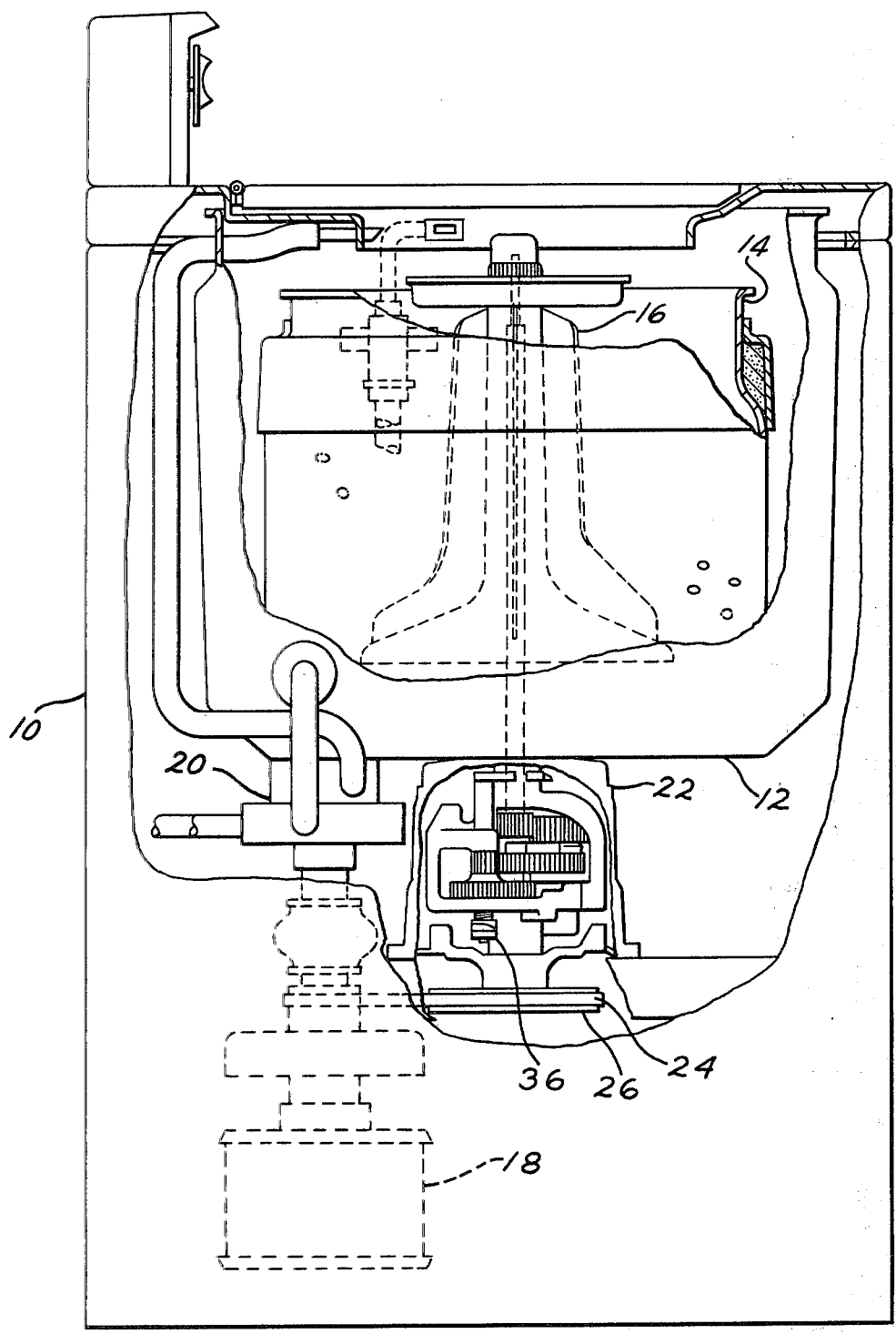
FIG. 1 is an elevation view, partly in section, of an automatic washing machine incorporating this invention.

Referring to FIG. 1, there is shown a conventional automatic clothes washing machine which includes an outer casing 10 within which is arranged a stationary liquid-containing tub 12. A rotatably mounted clothes basket 14 is positioned within the tub, and an agitator 16, which may be oscillated for effecting a washing action, is mounted within the basket 14.

An electric motor 18 is provided for driving a pump 20 by which water is circulated during the washing operation and drained from the tub at the conclusion of the operation.

A transmission 22 is positioned beneath the tub and arranged to drive the agitator with an oscillating motion during the washing cycle, and to drive the basket with a rapidly rotating motion during the spin cycle. The transmission 22 is driven by the motor 18 through a belt 24 and pulley 26.

In order to accomplish its multiple functions, the transmission necessarily includes a plurality of gears, as illustrated in FIG. 1, and the meshing points of these gears and the journals upon which the gears are mounted must be effectively lubricated in order to insure dependable longlife operation of the transmission and of the automatic clothes washing machine. It as been customary to provide such lubrication by substantially filling the transmission case with oil or other lubricant so that the gears and journals are immersed in a bath of oil. While this assures effective lubrication of the moving parts requiring such lubrication, it also necessarily requires a substantial amount of oil to fill the transmission case to the proper level. With the rapidly escalating price of oil in recent years, the oil required for this type of transmission lubrication arrangement has involved substantial increased cost.

Figure 2:
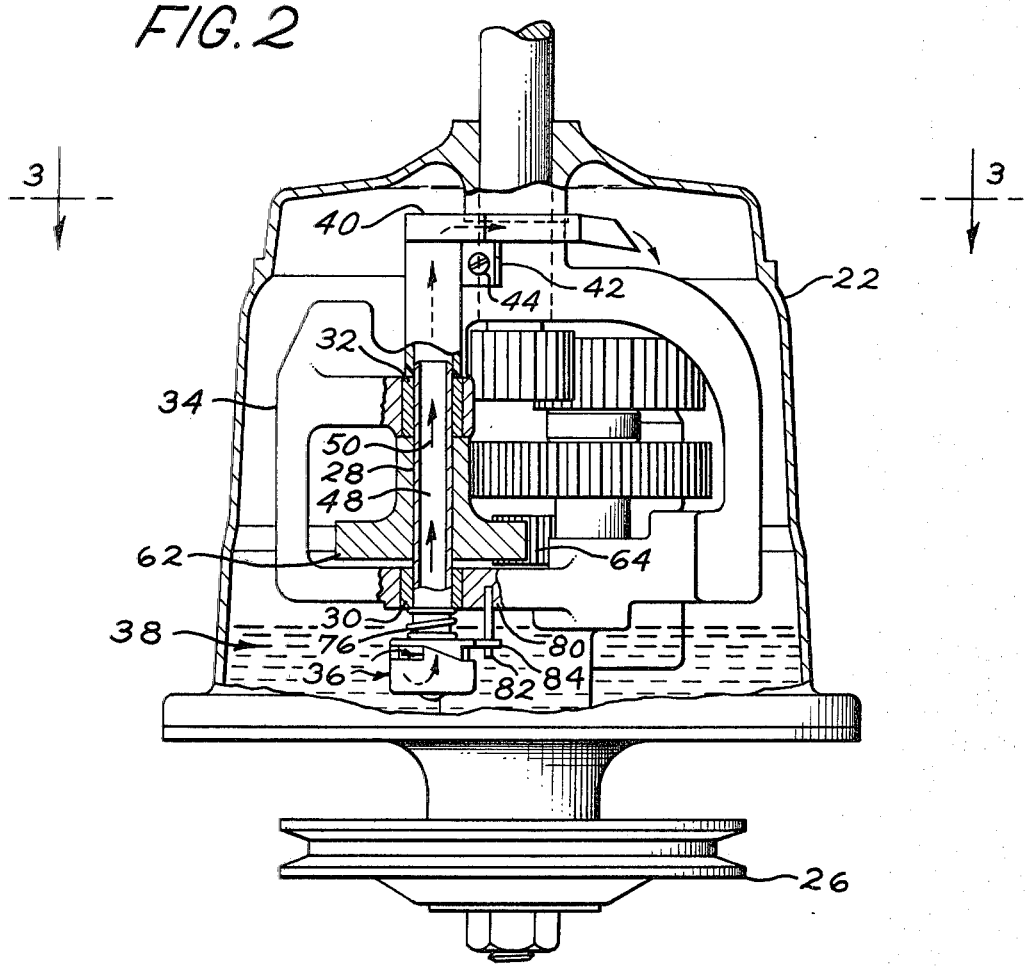
FIG. 2 is an enlarged view, partly in section, of the transmission of the washing machine shown in FIG. 1.
Figure 3:
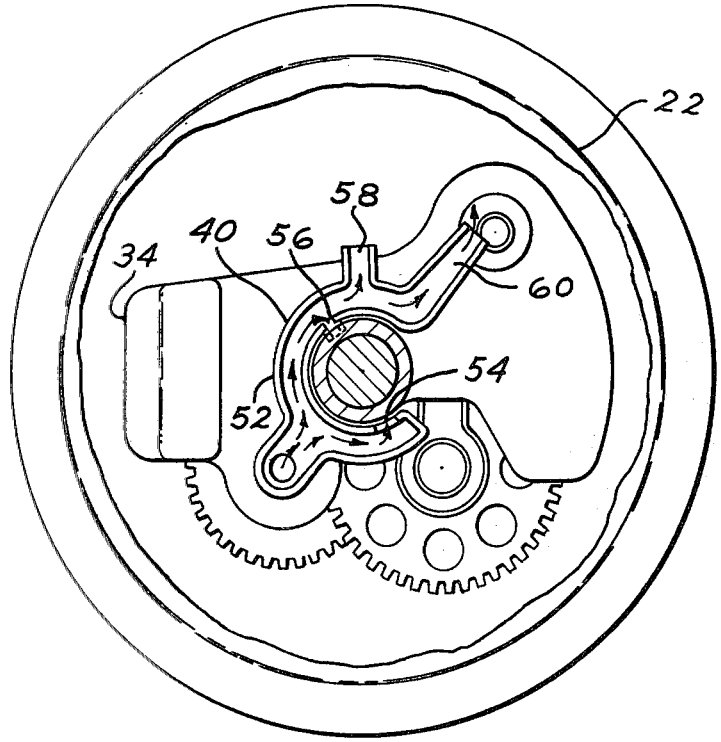
FIG. 3 is a sectional plan view taken along the line 3—3 in FIG. 2.

In accordance with the present invention, the necessity for providing this complete bath of oil in a transmission has been eliminated, and the amount of oil required for effective lubrication of the transmission has been substantially reduced. Referring now to FIGS. 2 and 3, in addition to FIG. 1, a lubrication system incorporating this invention includes a generally vertical hollow shaft 28, which is journaled in bearings 30, 32. The bearings, in turn, are mounted in apertures formed in a bracket 34, which is formed integrally with a frame supporting the several gears of the transmission. An oil pump 36 is positioned at the lower end of the shaft and is immersed in a reservoir 38 of oil or other lubricant indicated by dashed lines in FIG. 2. The amount required is only that necessary to assure that the pump 36 remains immersed during operation and it can be seen, by reference to FIG. 2, that this amount of oil is substantially less than would be required to immerse all of the gears and journals of the transmission. In the particular embodiment disclosed, the amount of oil was reduced to 35 to 40% of that previously required.

An oil distribution pan or container 40 is mounted at the upper end of the shaft 28 by means of brackets, one of which is shown at 42, and screws, one of which is shown at 44. The oil pan 40 is formed to provide an opening 46 adapted to be positioned in alignment with the hollow interior 48 of the shaft 28 at the upper end of the shaft, so that oil pumped upwardly through the shaft in the direction indicated by the arrows 50 in FIG. 2 is pumped through the opening 46 in the oil pan and distributed therefrom. The oil pan is formed to include a vertical wall 52 for confining the oil. It is further formed to provide a plurality of passages 54, 56, 58, 60 through this vertical wall, to direct the oil from the pan onto the particular areas of the transmission which require lubrication. Thus, for example, these passages are positioned so that the oil is directed to the meshing gear areas and to the gear journals. It will be appreciated that the oil distribution arrangement can be readily adapted to a variety of transmissions by merely shaping the oil distribution pan to provide outlet openings or passages immediately above the parts in any particular transmission which require lubrication.

The shaft 28 is driven from the transmission by means of a gear 62 which is fixed to the shaft 28 and is arranged to be driven by a gear 64 of the transmission.

Figure 4:
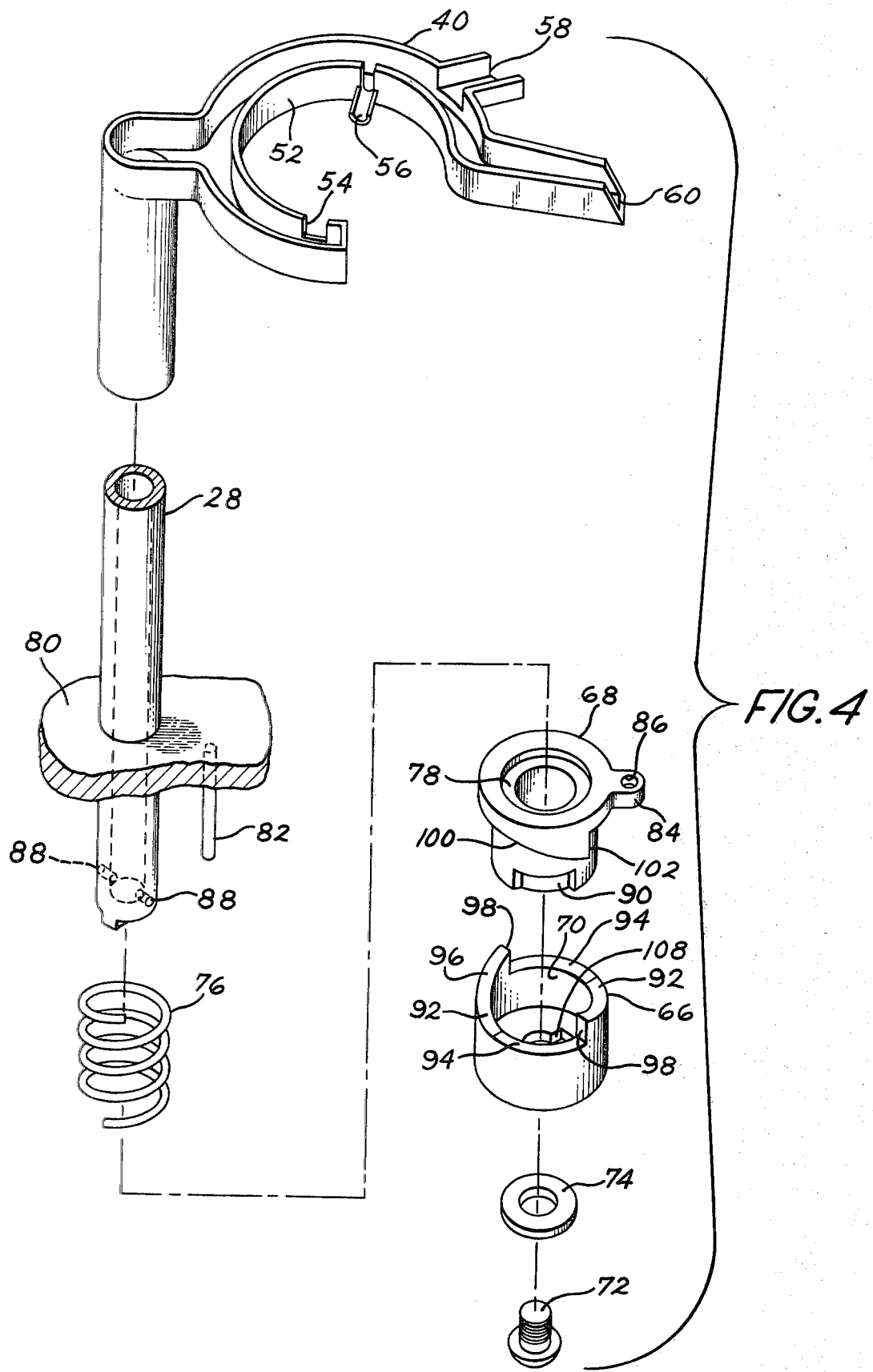
FIG. 4 is an exploded view showing the details of the oil pump and associated elements of this invention.

Referring now to the exploded view shown in FIG. 4 the individual elements of the lubrication system can be seen more clearly. The oil pump 36 includes a cup 66 and a piston 68 which is receivable within a chamber 70 formed by the cup 66. Both the cup and the piston are preferably made of nylon which provides low-friction, long-wearing qualities. The cup 66 is mounted to the lower end of the hollow shaft 28 by means of a screw 72, which engages screw threads formed on the interior shaft at the lower end thereof. A washer 74 is interposed between the screw 72 and the bottom face of the cup 66. The piston 68 is received on the shaft 28 and is positioned for sliding, reciprocating motion on the shaft. The piston is biased toward a position within the chamber of the cup 66 by means of a coil spring 76, which surrounds the lower end of the shaft 28. The spring is confined between a bottom wall 78 of a recess formed in the upper face of the piston, and the bottom wall 80 of the transmission frame. In order to permit reciprocating motion of the piston 68 but to prevent rotation of the piston with the shaft 28 and the cup 66, a stationary pin 82, fixed to and depending from the wall 80, is provided. The piston is formed to include a laterally extending ear 84 having an aperture 86 therein. The piston is mounted so that the pin 82 extends through the aperture 86 as shown in FIG. 2.

The shaft is provided near the lower end thereof with a diametrically extending passage 88 which provides communication between the exterior of the shaft and the hollow interior.

In the form of the invention shown, the piston 66 is formed, on the outer wall thereof, to provide two diametrically opposite recesses, one of which is shown at 90 in FIG. 4, which serve as inlet ports for admitting oil from the reservoir 38 to the pump. The piston 68 is further formed, on the interior wall thereof, to include two similar diametrically opposite recesses, not shown in FIG. 4 but shown in FIGS. 6, 7, 8 and 10 to be described later, which serve as outlet ports adapted to communicate with the passage 88 for supplying oil to the interior of the shaft 28, and then upwardly to the oil distribution pan 40, as previously described. The details of the inlet and outlet ports and the relationship thereof to other elements of this structure, will be described in detail in connection with FIGS. 5–10.

In order to effect the reciprocating movement of the piston 68 for obtaining the pumping action, the cup 66 and piston 68 are formed with cam surfaces on their engaging faces. In the particular form of the invention disclosed, the pump is designed to have two pumping cycles per revolution, so that two identical cam surfaces are provided, each extending over 180°. It will be apparent as this description proceeds, however, that, if desired, a single cam surface could be employed, so that only one pumping cycle per revolution is obtained, or, if desired, more than two identical cam surfaces could be provided so that more than two pumping cycles could be obtained per revolution.

Referring again to FIG. 4 and the cup 66 shown therein, the cam surface of the cup includes two diametrically opposite, generally circumferential portions indicated generally at 92. Each portion 92 extends over 180°, and is divided into two sections 94 and 96. The section 94 is generally flat, or horizontal, so that, as will be described in more detail in connection with FIGS. 5–10, the rotation of the cup during this portion of the engagement of the piston and the cup does not effect any upward movement of the piston. The section 96, on the other hand, is inclined as a ramp section, so that during this period of engagement, the piston is urged upwardly. At the end of ramp sections 96, the cam surface includes two diametrically opposite vertical or axial portions 98, so that as the cup reaches this point in its revolution, the piston is abruptly urged downwardly by the spring 76 to effect the pumping action.

While only partially shown in FIG. 4, the engaging face of the piston 68 is formed essentially identical with that of the engaging face of the cup. Thus, the piston includes two diametrically opposite, circumferential portions, one of which is shown at 100, and two diametrically opposite vertical or axial portions, one of which is shown at 102. The structure of the engaging cam surfaces of the piston is shown more clearly in FIG. 6. As there indicated, each generally circumferential portion 100 of the piston, like the corresponding portion of the cup, includes a generally flat section 104 and a ramp section 105, with the vertical or axial portions 102 being interposed between the end of each ramp section 105 and the beginning of the next flat section 104.

Figure 6:
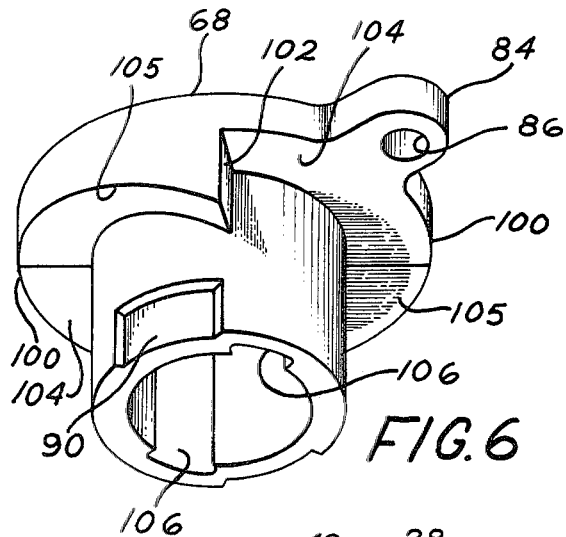
FIG. 6 is a perspective view of the piston of the oil pump.

The recesses 106 in the inner wall of the piston, which provide the outlet ports previously referred to, are also shown in FIG. 6. These recesses 106 are formed diametrically opposite each other on the inner wall of the piston 68. They extend upwardly from the bottom of the piston sufficiently far to maintain communication with the passage 88 in the shaft 28, as the piston moves downwardly to effect pumping of oil from the pump into the hollow interior 48 of the shaft 28.

Figure 9:
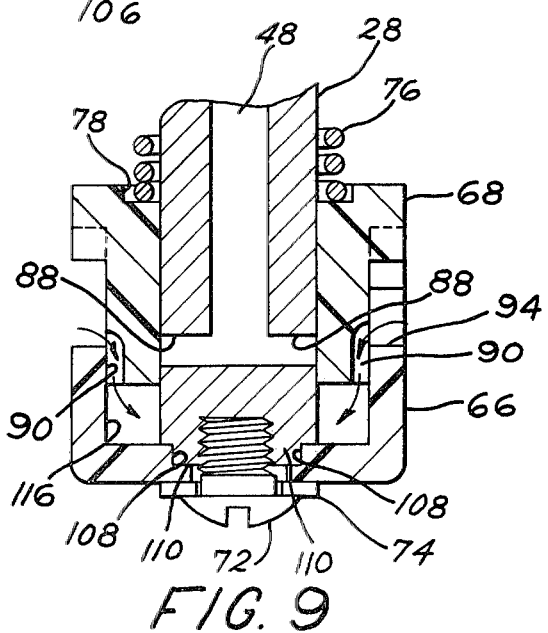
FIG. 9 is a sectional view taken along the line 9—9 in FIG. 7.

In order to insure that the cup is positioned in proper relationship to the shaft, and to insure that the outlet ports 106 are positioned in alignment with the passages 88 when oil is to be discharged from the pump, the cup is provided with diametrically opposite recesses, one of which is shown at 108 in FIG. 4, and both of which are shown at 108 in FIG. 9. The lower end of the shaft is formed, as indicated at 110 in FIG. 9, to include projections which are received in the recesses 108. Thus, when the cup is assembled on the lower end of the shaft, it has an established relationship with the shaft, which insures that the outlet ports and the shaft passage 88 are in communication during the discharge cycle of the oil pump. Correspondingly, this arrangement of the cup relative to the shaft insures that communication between the passage 88 and the outlet ports 106 is blocked during the remainder of the cycle of the pump. The recesses 108 also are positioned in a particular relationship to the cam surfaces of the cup. In the particular embodiment shown, these recesses 108 are displaced approximately 90° from the axial portions 98.

Figure 5:
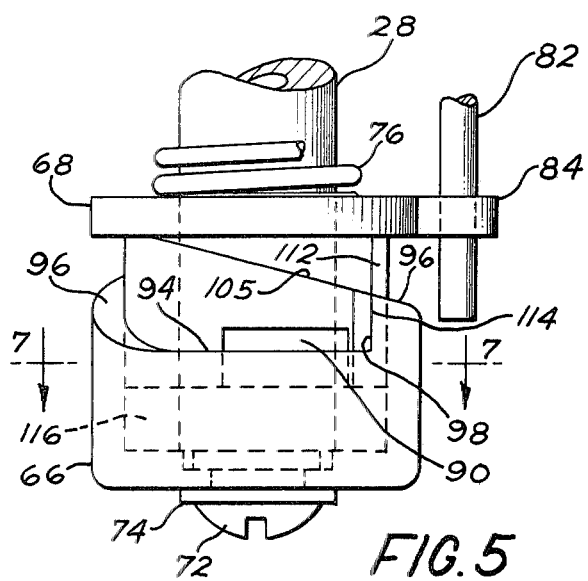
FIG. 5 is an elevation view of the oil pump employed in this invention.

The operation of the oil pump will now be described with particular reference to FIG. 5–10. Referring first to FIG. 5, the piston 68 is shown just prior to the initiation of a downward pumping stroke. The cup 66, which rotates with the shaft in a counterclockwise direction as viewed in FIG. 7, has rotated to a point where the tip 112 of the ramp section 105 of the piston is just approaching the tip 114 of the ramp section 96 of the cup 66. At this point, the piston has been moved by the interengaging ramp sections to a position providing an oil receiving chamber 116 between the bottom of the piston and the bottom inner wall of the chamber formed by the cup 66. Further, the piston has been moved upwardly to a point where each of the recesses 90 has been raised above the level of the corresponding flat section 94 of the cup, thereby providing open inlet ports for flow of oil from the reservoir 38 into the chamber 116. The piston and cup are so related that the piston rides partially up the ramps 96 before the upper edges of the recesses 90 are raised above the corresponding flat sections 94 of the cam surface of the cup. Thus, the inlet ports remain closed until the piston has reached this point (approximately halfway up the ramp); in the meantime, the bottom of the piston has moved upwardly from the bottom inner wall of the cup to provide a space therebetween while the inlet ports are still closed, thereby creating a partial vacuum in the chamber 116. This assists the inflow of oil from reservoir 38 when the inlet ports open, so that the rate of the inflow of oil is not dependent entirely on the head provided by the oil in the reservoir 38.

Figure 7:
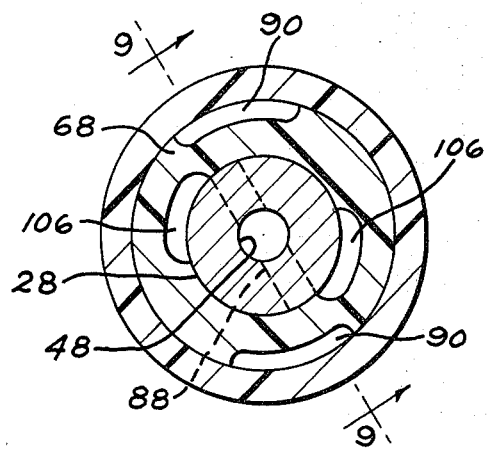
FIG. 7 is a sectional view taken along the line 7—7 in FIG. 5.

During this time, as shown in FIGS. 7 and 9, the outlet ports formed by the recesses 106 are disposed out of alignment with the passage 88 in the shaft, so that no oil may flow back into the chamber from the hollow shaft 28.

Figure 8:
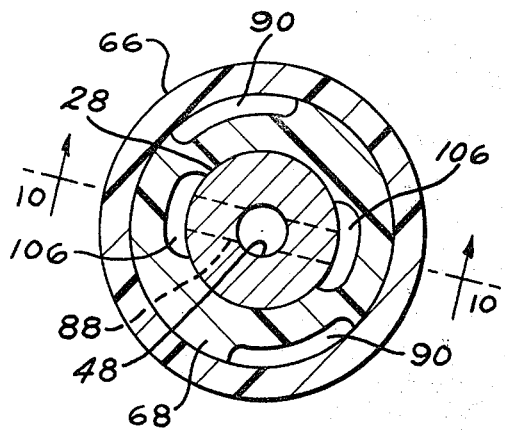
FIG. 8 is a view similar to FIG. 7, but showing the shaft and cup rotated from the position shown in FIG. 7.

As the cup continues to rotate counterclockwise from the position shown in FIG. 5, the tip 112 of the piston passes over the edge of the tip 114 of the cup. The piston is then driven rapidly downward by the bias of the spring 76. At the same time, the shaft has been rotated so that the passage 88 is placed in communication with the recesses 106, as shown in FIGS. 8 and 9, thereby opening the outlet ports and providing communication from the pump through the outlet ports and the passage 88 to the interior of the hollow shaft 28. As the piston moves rapidly downward, the inlet ports provided by the recesses 90 are covered by the wall of the cup 66, thereby cutting off the inflow of oil from the reservoir 38, and the oil is discharged rapidly from the chamber 116 through the outlet ports formed by the recesses 106 into the shaft 28 and upwardly for distribution by the pan 40 to the points of the transmission to be lubricated.

By reference again to FIG. 5, it can be seen that once the piston moves downwardly, further rotation of the cup causes the tip 112 to move along the flat section 94 of the cam surface of the cup, so that the piston remains in its downward position through approximately 90° of rotation of the shaft and cup. During this time, as shown in FIG. 8, the passage 88 remains in communication with the outlet ports, providing a path for discharge of oil from the chamber through the outlet ports.

Figure 10:
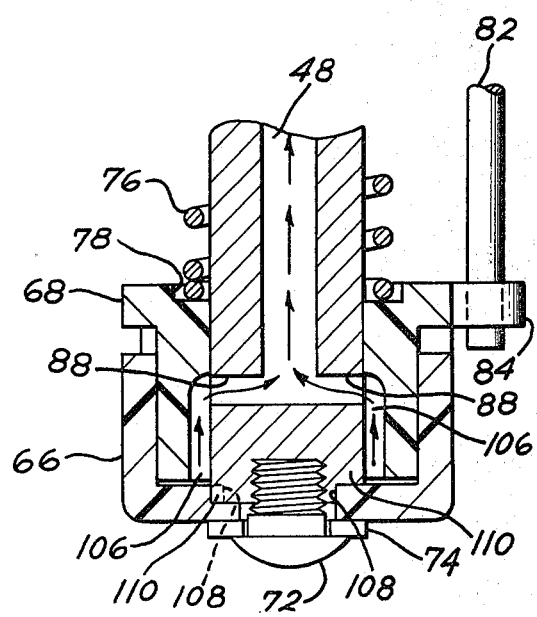
FIG. 10 is a sectional view, similar to FIG. 9, but taken along the line 10—10 in FIG. 8.

The pumping action is further illustrated in FIGS. 9 and 10, FIG. 9 representing a sectional view of the relationship of the parts when the oil pump is in the position shown in FIGS. 5 and 7, and FIG. 10 representing sectional view of the relationship of the parts when the oil pump is the position shown in FIG. 8. Thus, as shown in FIG. 9, the inlet ports formed by the recesses 90 are open above the flat sections of the cam surface of the cup, and oil flows inwardly into the chamber 116, as indicated by the arrows in FIG. 9. When the shaft 28 and cup 66 have rotated to the position shown in FIGS. 8 and 10, the piston has moved downwardly to its lowest position, the inlet ports have been closed and the outlet ports formed by the recesses 106 have been placed in communication with the passage 88 extending from the exterior wall to the hollow interior 48 of the shaft 28. Oil is thereby discharged through the outlet ports and passage 88 upwardly through the interior of the shaft for distribution to the transmission by means of the oil distribution pan 40 and the passages 54, 56, 58 and 60.

In a specific embodiment of this invention, the shaft rotates at a speed of 200 revolutions per minute. Since in the embodiment described there are two oil pumping cycles per revolution, a total of 400 oil pumping cycles per minute are obtained. Thus, a fully adequate flow of oil for effective lubrication of the transmission is obtained with the use of a vary small oil pump. In one specific embodiment of the invention, the outer diameter of the cup is approximately one inch and its inner diameter is approximately ⅝ inch. Both the cup and the piston are formed of nylon, which provides low friction, long-wearing qualities, contributing to a long life of the pump and its associated lubrication system.

While the specific preferred embodiment of the invention shown and described includes a cup and piston formed to include two identical cam surfaces, each extending angularly approximately 180°, and includes two inlet ports and two outlet ports, so that two pumping cycles per revolution are obtained, it will be apparent that, if desired, the cup and piston could be formed to include only a single cam surface extending 360° so that one pumping cycle per revolution is obtained. Conversely, if desired, the pump could be formed to provide more than two pumping cycles per revolution.

Thus, while a specific embodiment of this invention has been shown and described, it will be apparent to those skilled in the art that modifications of this particular structure may be made, and it is intended by the appended claims to cover all such modifications as come with the spirit and scope of this invention.

What is claimed is:

1. In an automatic washing machine including a basket, an agitator within the basket and a transmission for driving the agitator and the basket, a lubrication system therefor comprising:
   (a) a hollow shaft driven from the transmission;
   (b) a cup mounted on the lower end of said shaft for rotation therewith, said cup defining a chamber;
   (c) a piston slidably positioned on said shaft and receivable within said chamber;
   (d) means preventing rotation of said piston but permitting reciprocating motion thereof on said shaft relative to said chamber;
   (e) means biasing said piston toward said chamber;
   (f) said piston being formed to provide an inlet port and an outlet port;
   (g) said hollow shaft having a passage from the exterior thereof to the hollow interior thereof, said outlet port being positioned in communication with said shaft passage at predetermined intervals during rotation of said shaft;
   (h) said cup and said piston having engaging cam faces formed to cause said piston to move along said shaft in a direction away from said chamber during a portion of the cycle of rotation of said shaft to open said inlet port, said cam faces being further shaped to provide abrupt return movement of said piston into said chamber under the influence of said biasing means at said predetermined intervals to close said inlet port and force lubricant through outlet port and said passage into the hollow interior of said shaft; and
   (i) means for distributing lubricant from the upper end of said shaft to the transmission.

2. The lubrication system of claim 1 wherein each of said cam faces comprises:
   (a) a generally circumferential portion for causing said piston to move along said shaft in a direction away from said chamber; and
   (b) a substantially axial portion at the end of said circumferential portion to provide said abrupt return movement of said piston.

3. The lubrication system of claim 2 wherein:
   (a) said circumferential portion includes a flat section for allowing said piston to remain in a position substantially at the bottom of said chamber and a ramp section for causing said piston to move along said shaft against said biasing means.

4. The lubrication system of claim 3, wherein inlet port is positioned so as to remain closed during initial movement of said piston upwardly on said ramp section to cause a partial vacuum to be developed in said chamber before said inlet port opens.

5. The lubrication system of claim 3, wherein said generally circumferential portion is approximately equally divided into said flat section and said ramp section.

6. The lubrication system of claim 1 wherein said piston includes at least one recess on the outer wall thereof to provide a space between said piston and the inner wall of said chamber for forming said inlet port; said inlet port being blocked when said piston is below a predetermined position within said chamber.

7. The lubrication system of claim 6 wherein said piston further includes at least one recess on the inner wall thereof to provide a space between said piston and said shaft for forming said outlet port.

8. The lubrication system of claim 1 wherein:
   (a) said piston includes a recess on the outer wall thereof for providing said inlet port between said piston and said cup at a first predetermined interval; and
   (b) said piston further includes a recess on the inner wall thereof for providing said outlet port in communication with said shaft passage at a second predetermined interval.

9. The lubrication system of claim 1 wherein said means for distributing lubricant comprises:
   (a) a pan mounted in lubricant-receiving communication with the upper end of said shaft and extending over said transmission;
   (b) said pan including a plurality of discharge passages, each of which is disposed above a portion of said transmission to be lubricated for discharging lubricant thereto.

10. The lubrication system of claim 1 wherein said shaft has an internally threaded portion at said lower end, and further including a screw engaging said threaded portion to mount said cup on said shaft for rotation therewith.

11. The lubrication system of claim 1 and further including means for positioning said cup in a predetermined angular relationship with respect to said shaft passage.

12. The lubrication system of claim 11 wherein said means for positioning said cup comprises:
   (a) a recess formed in the bottom inner wall of said cup; and
   (b) a projection formed on the lower end of said shaft and received in said recess for providing a predetermined angular position of said cup with respect to said shaft, said projection having a predetermined angular relationship with respect to said shaft passage.

13. The lubrication system of claim 1 wherein said biasing means is a spring.

14. The lubrication system of claim 13 wherein said spring is a coiled compression spring surrounding said shaft.

15. The lubrication system of claim 1 wherein said means for preventing rotation of said piston comprises:
   (a) an ear formed on said piston and having an aperture therein; and
   (b) a stationary pin mounted on the transmission and extending through said aperture.

16. In an automatic washing machine including a basket, an agitator within the basket and a transmission for driving the agitator and the basket, a lubrication system therefor comprising:

(a) a hollow shaft driven from the transmission;

(b) a cup mounted on the lower end of said shaft for rotation therewith, said cup defining a chamber;

(c) a piston slidably positioned on said shaft and receivable within said chamber;

(d) means preventing rotation of said piston but permitting reciprocating motion thereof on said shaft relative to said chamber;

(e) means biasing said piston toward said chamber;

(f) said piston being formed to provide two diametrically opposite inlet ports and two diametrically opposite outlet ports;

(g) said hollow shaft having a passage from the exterior thereof to the hollow interior thereof, said outlet ports being positioned in communication with said shaft passage at predetermined intervals during rotation of said shaft;

(h) said cup and said piston having engaging cam faces, each of said cam faces including two generally circumferential portions, each portion extending angularly approximately 180 degrees, and each portion including a ramp section for causing said piston to move along said shaft in a direction away from said chamber;

(i) each of said generally circumferential portions further including a flat section for allowing said piston to remain in a position substantially at the bottom of said chamber during a portion of the cycle of rotation of said shaft;

(j) said cam faces further including two substantially axial portions connecting the ends of said circumferential portions to provide abrupt return movement of said piston;

(k) each of said inlet ports being positioned so as to remain closed during initial movement of said piston in a direction away from said chamber to cause a partial vacuum to be developed in said chamber before said inlet ports open.

* * * * *